United States Patent
Nakajima et al.

(10) Patent No.: US 6,877,798 B2
(45) Date of Patent: Apr. 12, 2005

(54) ROOF MOLDING MOUNTING STRUCTURE FOR VEHICLE

(75) Inventors: Yasushi Nakajima, Saitama (JP); Katsumi Hisada, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/312,580

(22) PCT Filed: Jul. 6, 2001

(86) PCT No.: PCT/JP01/05907
§ 371 (c)(1),
(2), (4) Date: Jul. 28, 2003

(87) PCT Pub. No.: WO02/06087
PCT Pub. Date: Jan. 24, 2002

(65) Prior Publication Data
US 2004/0012229 A1 Jan. 22, 2004

(51) Int. Cl.[7] .............................................. B60R 13/04
(52) U.S. Cl. ....................................................... 296/210
(58) Field of Search ................................ 296/210, 213, 296/93

(56) References Cited

U.S. PATENT DOCUMENTS

| | | | | |
|---|---|---|---|---|
| 4,884,380 A | * | 12/1989 | Yada et al. | 52/208 |
| 4,930,279 A | * | 6/1990 | Bart et al. | 52/466 |
| 5,133,537 A | * | 7/1992 | Shirahata et al. | 296/93 |
| 5,248,179 A | * | 9/1993 | Biermacher et al. | 296/146.15 |

FOREIGN PATENT DOCUMENTS

| | | |
|---|---|---|
| JP | 2-171315 | 7/1990 |
| JP | 6-29952 | 4/1994 |
| JP | 10-24777 | 1/1998 |
| JP | 11-59286 | 3/1999 |
| JP | 11-291836 | 10/1999 |
| JP | 2002-029327 | 1/2002 |

* cited by examiner

*Primary Examiner*—Dennis H. Pedder
(74) *Attorney, Agent, or Firm*—Arent Fox PLLC

(57) ABSTRACT

A mounting groove (G) defined in a joint area between a roof panel (R) and a side structure (S) includes a first rising wall (11) extending downwards from a side edge of a roof panel body (10) with no undercut provided therein, and a second rising wall (13) extending downwards from a side edge of the side structure (S) and inclined so as to be spaced apart from the first rising wall (11) on the side of a lower end of the second rising wall. A roof molding (M) includes a lid (17), a base portion (18) having a notch (22) defined in a side opposed to the first rising wall (11), and a pair of lips (19, 20) extending laterally from a lower end of the base portion (18) and resiliently abutting against the first and second rising walls (11, 13). The side structure (S) has a step (21) against which the lid (17) of the roof molding (M) is capable of abutment. Thus, it is possible to reliably prevent the falling-off of the roof molding (M) from the mounting groove (G), while ensuring the workability for the roof panel (R).

3 Claims, 4 Drawing Sheets

ROOF MOLDING MOUNTING STRUCTURE FOR VEHICLE

FIELD OF THE INVENTION

The present invention relates to a structure of mounting of a roof molding for a vehicle, in which the roof molding is mounted in a mounting groove defined in a joint area between a roof panel and a side structure.

BACKGROUND ART

Conventional structures of mounting of a roof molding for a vehicle are shown in FIGS. 4A and 4B.

As shown in FIG. 4A, a roof molding M is mounted in a mounting groove G defined in a joint area between a roof panel R and a side structure S. A roof panel body 10 of the roof panel R includes a first rising wall 11 extending downwards from a side edge of the roof panel body 10, and a bottom wall 12 extending horizontally from a lower end of the first rising wall 11. The side structure S includes a second rising wall 13 extending downwards from a side edge of the side structure S, and a bottom wall 14 extending horizontally from a lower end of the second rising wall 13. The bottom wall 12 of the roof panel R and the bottom wall 14 of the side structure S are superposed one on another and welded to each other by welding 15 to form a horizontal bottom wall 16 of the mounting groove G. The first rising wall 11 of the roof panel R is inclined at its lower end inwards of a vehicle body with respect to a vertical direction, and the second rising wall 13 of the side structure S is inclined at its lower end outwards of the vehicle body with respect to the vertical direction. Therefore, the width of the mounting groove G is increased from above to below.

The roof molding M made of a synthetic resin includes a lid 17, a base portion 18 and first and second lips 19 and 20. The lid 17 covers an opening in an upper portion of the mounting groove G, and the first and second lips 19 and 20 extending laterally from a lower end of the base portion 18 extending downwards from the lid 17 are resiliently deformed, so as to fold upwards, whereby they are brought into abutment against the first and second rising walls 11 and 13, respectively.

The conventional structure shown in FIG. 4B is different from the conventional structure shown in FIG. 4A in that a first rising wall 11 of a roof panel R extends vertically downwards, and the other construction is the same as the conventional structure shown in FIG. 4A.

The structures of mounting of the roof molding shown in FIGS. 4A and 4B are known from Japanese Patent Application Laid-open No.11-291836, for example.

It should be noted here that in the conventional structure shown in FIG. 4A, when the pulling-up force in the direction of an arrow a is applied to one end of the lid 17 of the roof molding M, the other end of the lid 17 is slid in the direction of an arrow b and hence, the roof molding M is about to turn about a contact point c between the first lip portion 19 and the first rising wall 11. However, because the second rising wall 13 is inclined obliquely, the second lip portion 20 is hard to move upwards along the second rising wall 13, whereby the falling-off of the roof molding M from the mounting groove G is prevented. When the pulling-up force in the direction of an arrow d is applied to the other end of the lid 17 of the roof molding M, one end of the lid 17 is slid in the direction of an arrow e, and hence, the roof molding M is about to turn about a contact point f between the second lip portion 20 and the second rising wall 13. However, because the first rising wall 11 is inclined obliquely, the first lip portion 19 is hard to move upwards along the first rising wall 11, whereby the falling-off of the roof molding M from the mounting groove G is prevented.

In this way, in the conventional structure shown in FIG. 4A, it is possible to inhibit the upward movement of the left and right lip portions 19 and 20 to prevent the falling-off of the roof molding M due to the inclination of the first and second rising walls 11 and 12, but the conventional structure shown in FIG. 4A suffers from the following problem: When the roof panel R is formed by pressing, because the first rising wall 11 inclined with respect to the vertical direction has an undercut, the structure of a press die is complicated to cause an increase in cost.

In the conventional structure shown in FIG. 4B, the first rising wall 11 of the roof panel R extends vertically and has no undercut, the structure of a press die can be simplified to provide a reduction in cost. However, the conventional structure shown in FIG. 4B suffers from the following problem: When the other end of the lid 17 of the roof molding M is pulled up in the direction of the arrow d, and the roof molding M is about to turn about the contact point f, while the one end of the lid 17 is slid in the direction of the arrow e, the first lip portion 19 is slid in the direction of an arrow g on the first rising wall 11, because the first rising wall 11 is not inclined, whereby the roof molding M is liable to fall off.

DISCLOSURE OF THE INVENTION

The present invention has been accomplished in view of the above circumstances, and it is an object of the present invention to reliably prevent falling-off of the roof molding from the mounting groove, while ensuring the workability for the roof panel or the side structure.

To achieve the above object, according to an aspect and feature of the present invention, there is provided a structure of mounting of a roof molding for a vehicle, in which a roof molding is mounted in a mounting groove defined in a joint area between a roof panel and a side structure, characterized in that the mounting groove includes a first rising wall extending downwards from a side edge of one of a roof panel body and the side structure with no undercut provided therein, a second rising wall extending downwards from a side edge of the other of the roof panel body and the side structure and inclined so as to be spaced apart from the first rising wall on the side of a lower end of the second rising wall, and a bottom wall connecting the lower ends of the first and second rising walls to each other; the roof molding includes a lid covering the mounting groove, a base portion extending downwards from a lower surface of the lid and having a notch defined in a side opposed to the first rising wall, and a pair of lips extending laterally from a lower end of the base portion and resiliently abutting against the first and second rising walls; wherein the other of the roof panel body and the side structure has a step against which the lid of the roof molding is capable of abutment.

With the above arrangement, when the lid of the roof molding is put into abutment against the step of the other of the roof panel body and the side structure, and the roof molding is turned about an abutting point, the base portion is folded at the notch due to a load provided when one of the lips has been pushed against the first rising wall of the mounting groove, whereby both the lips and the base portion are fitted into the mounting groove and thus, the roof molding is mounted. When the roof molding has been mounted in this manner, even if an attempt is made to turn the roof molding about a pivot point provided by the one lip abutting against the first rising wall of the mounting groove, such turning is inhibited to prevent the falling-off of the roof molding, because the second rising wall against which the other lip abuts is inclined. In addition, even if an attempt is made to turn the roof molding about the pivot point provided by the abutment between the step and the lid, such turning is inhibited to prevent the falling-off of the roof molding, because the one lip in a position lower in level than the step strongly interferes with the first rising wall. Further, since the first rising wall extends from the side edge of one of the roof panel body and the side structure with no undercut provided therein, it is possible to simplify the structure of a press die for forming the roof panel or the side structure to contribute to a reduction in cost.

BRIEF DESCRIPTION OF THE DRAWINGS

FIGS. 1 to 3 show an embodiment of the present invention, wherein FIG. 1 is a perspective view of an automobile provided with a roof molding;

FIG. 2 is an enlarged sectional view taken along a line 2—2 in FIG. 1;

FIG. 3 is a view for explaining the operation in the mounting of the roof molding.

BEST MODE FOR CARRYING OUT THE INVENTION

An embodiment of the present invention will now be described with reference to FIGS. 1 to 3.

Figure 1:
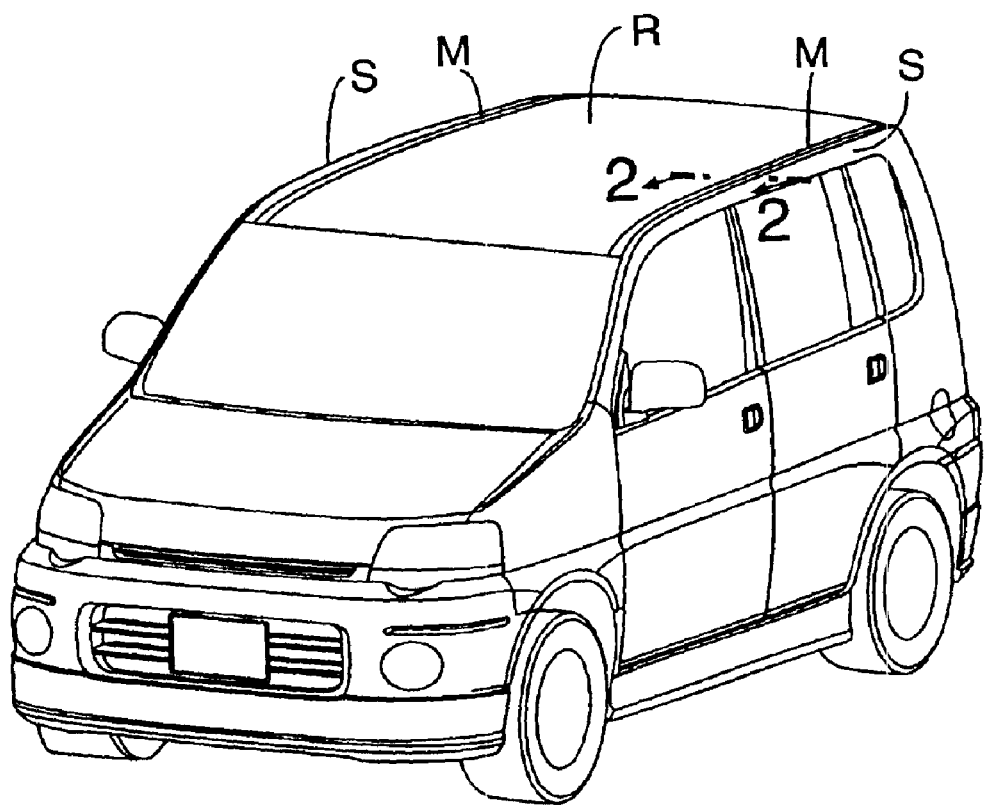

As shown in FIG. 1, roof moldings M, M are mounted in mounting grooves defined in joint areas or connections between left and right opposite side-edges of a roof panel R and left and right side-structures S, S in an automobile.

Figure 2:
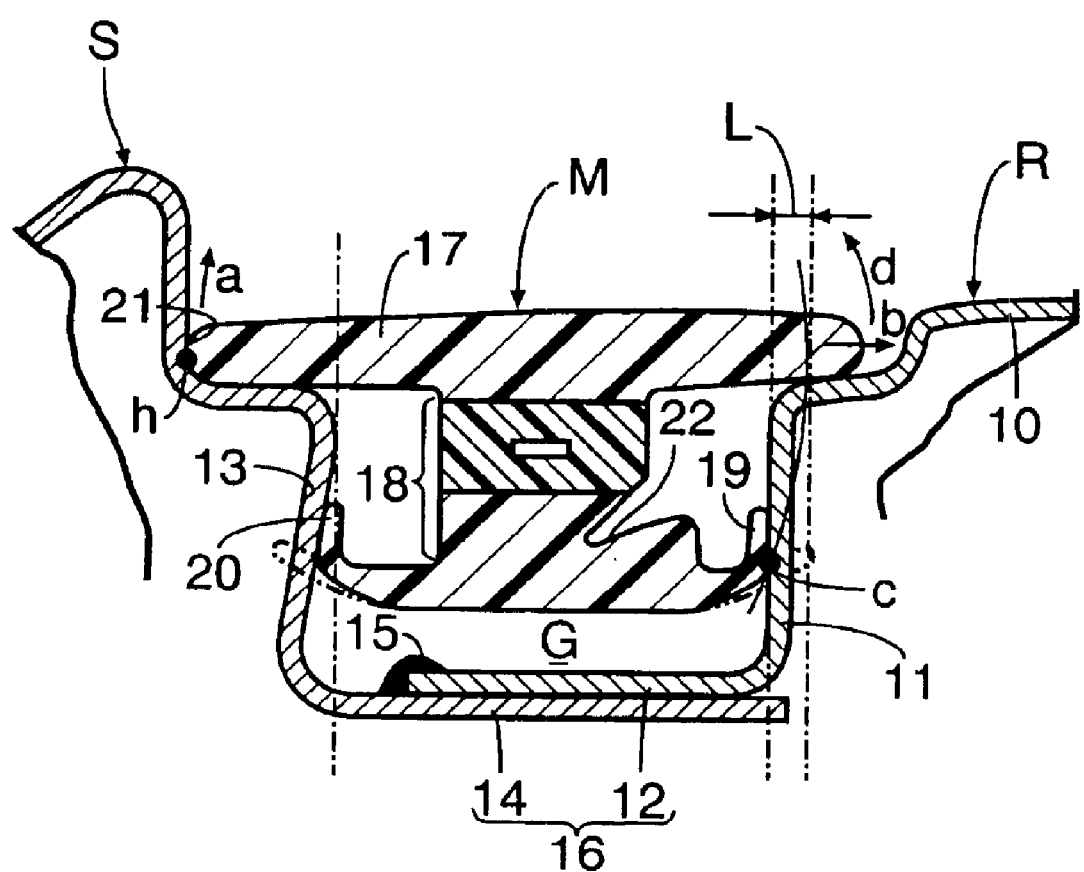

As shown in FIG. 2, a side edge of a roof panel body 10 is formed with a first rising wall 11 extending vertically downwards and having no undercut, and a bottom wall 12 extending horizontally from a lower end of the first rising wall 11. A side edge of the side structure S is formed with a second rising wall 13 extending obliquely downwards, and a bottom wall 14 extending horizontally from the lower end of the second rising wall 13. The bottom wall 12 of the roof panel R and the bottom wall 14 of the side structure S are welded at 15 to each other to form a horizontal bottom wall 16 of a mounting groove G. The first rising wall 11 of the roof panel R extends vertically downwards, and a lower end portion of the second rising wall 13 of the side structure S is inclined outwards of a vehicle body with respect to the vertical direction and hence, the width of the mounting groove G is increased from the above to the below. The side structure S has a step 21 outside an upper portion of the second rising wall 13.

The roof molding M has a lid 17 made of a soft synthetic resin covering an upper portion of the mounting groove G. The lid 17 formed into a band-shape is formed so that its lateral one end can be brought into abutment against the step 21 of the side structure S. The lid 17 has a base portion 18 extending downwards from its lower surface and having upper half formed of a hard synthetic resin and lower half formed of a soft synthetic resin. The lower half of the base portion 18 formed of the soft synthetic resin has a triangular notch 22 and a first lip 19 defined in its side opposed to the first rising wall 11 of the roof panel R, and a second lip 20 defined in its side opposed to the second rising wall 13 of the side structure S.

A procedure for mounting the roof molding M into the mounting groove G will be described below.

Figure 3:
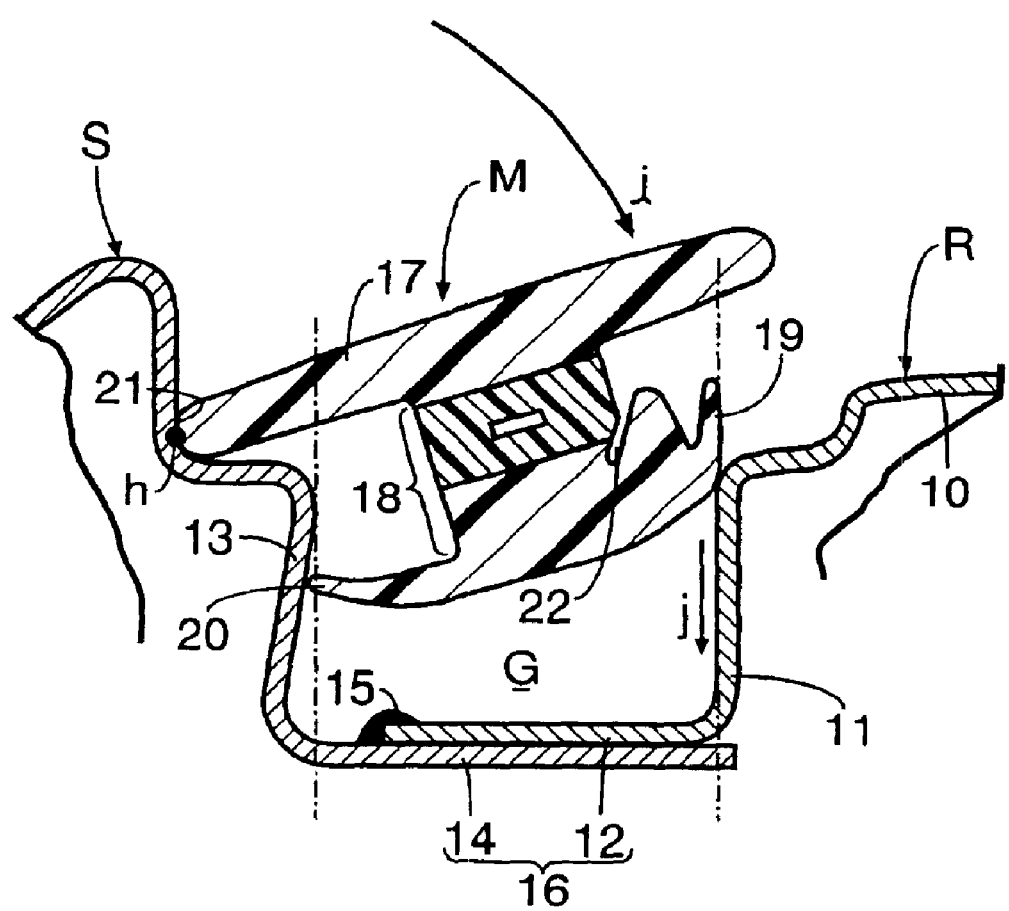
Figure 4A:
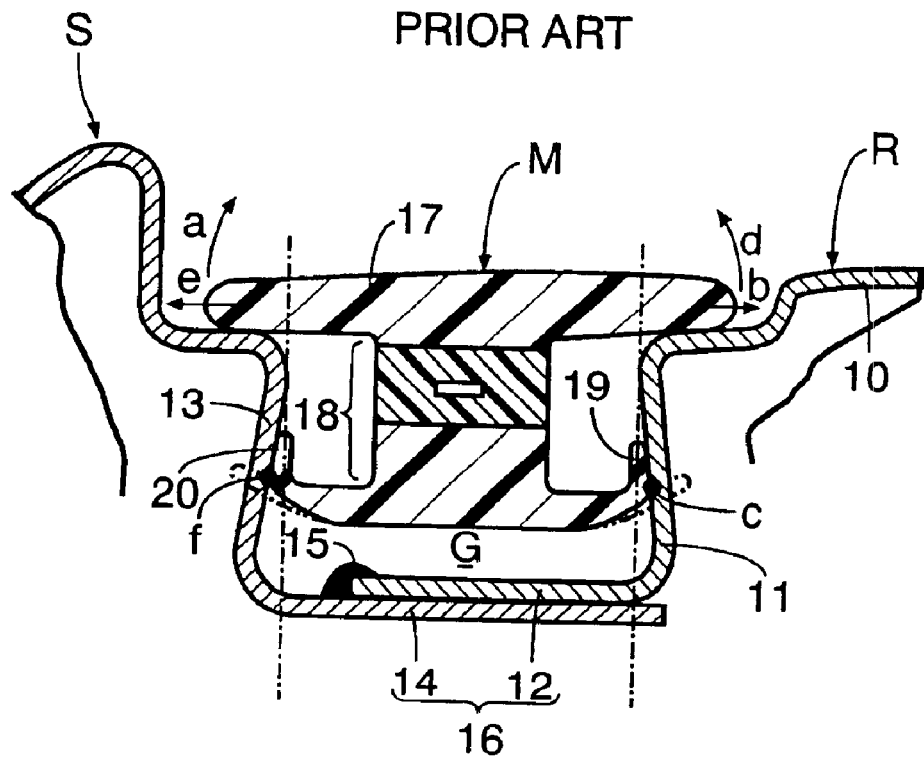
FIGS. 4A and 4B are views showing conventional structures of mounting of a roof molding for a vehicle.
Figure 4B:
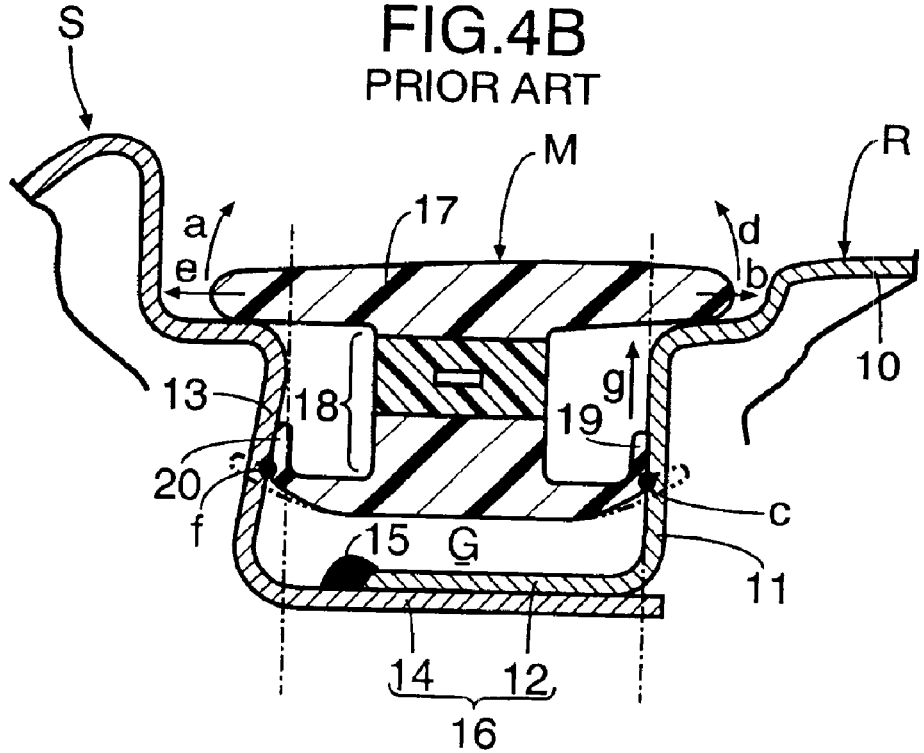

As shown in FIG. 3, when one end of the lid 17 of the roof molding M in an inclined state is brought into abutment against the step 21 of the side structure S, and the other end of the lid 17 is pushed downwards, the roof molding M is turned about one end of the lid 17 serving as a pivot point h in the direction of an arrow i, and the first lip portion 19 interferes with an upper end of the first rising wall 11 of the roof panel R. As a result, the first lip portion 19 is folded upwards by a load received from the upper end of the first rising wall 11, and the notch 22 in the base portion 18 is deformed so as to be crushed, whereby the first lip portion 19 is slid in the direction of the arrow j along the first rising wall 11 beyond the upper end. In this manner, the roof molding M is mounted in the mounting groove G, as shown in FIG. 2. In this state, the first lip portion 19 in abutment against the first rising wall 11 is folded upwards, and the second lip portion 20 in abutment against the second rising wall 13 is folded upwards, thereby producing a resisting force for preventing the falling-off of the roof molding M from the mounting groove G.

In FIG. 2, when a pulling-up force in the direction of an arrow a is applied to the one end of the lid 17 of the roof molding M, the other end of the lid 17 is slid in the direction of an arrow b, and hence, the roof molding M is about to turn about a contact point c between the first lip portion 19 and the first rising wall 11. However, because the second rising wall 13 is inclined obliquely, the second lip portion 20 is hard to move upwards along the second rising wall 13, whereby the falling-off of the roof molding M from the mounting groove G is prevented. On the other hand, when a pulling-up force in the direction of an arrow d is applied to the other end of the lid 17 of the roof molding M, the lid 17 is about to turn about the one end abutting against the step 21 and serving as the pivot point h. However, because the position of the pivot point h is higher in level than the position of the first lip portion 19, the locus of the end of the first lip portion 19 projects with a lap amount L to an extent larger than the first rising wall 11. Thus, when the first lip portion 19 is moved upwards, a large resistance can be generated, notwithstanding that the first rising wall 11 is not inclined, thereby reliably preventing the falling-off of the roof molding M.

As described above, the side structure S is formed with the step 21 capable of being brought into abutment against the one end of the lid 17 of the roof molding M, so that the roof molding M is turned about the step 21 serving as the pivot point h. Therefore, while simplifying the structure of a press die for forming the roof panel R in such a manner that the first rising wall 11 has no undercut with respect to the roof panel body 10, it is possible to ensure that the first lip portion 19 of the roof molding M is hard to slide upwards along the first rising wall 11, thereby reliably preventing the falling-off of the roof molding M. Moreover, the notch 22 is formed in the base portion 18 of the roof molding M in the opposed relation to the first rising wall 11 and hence, when the roof molding M is mounted in the mounting groove G, while being turned about the step 21 serving as the pivot point h, the first lip portion 19 can be passed through the upper end of the first rising wall 11 without hindrance by deforming the notch 22 in a crushing manner.

Although the embodiment of the present invention has been described in detail, it will be understood that the present invention is not limited to the above-described embodiment, and various modifications in design may be made without departing from the subject matter of the invention defined in the claim.

For example, in the embodiment, the first rising wall 11 having no undercut is formed on the roof panel R, and the step 21 is formed on the side structure S. Alternatively, the positional relationship between the first rising wall 11 and the step 21 may be reversed, namely, a first rising wall having no undercut may be formed on the side structure S, and a step may be formed on the roof panel R.

INDUSTRIAL APPLICABILITY

As discussed above, the structure of mounting of the roof molding for the vehicle according to the present invention is applicable to any type of an automobile such as a sedan, a van, a wagon, RV and the like, if the structure is suited to mount a roof molding M in a mounting groove G defined in a joint area between a roof panel R and a side structure S in such automobile.

What is claimed is:

1. A structure to mount a roof molding to a vehicle, wherein the roof molding is mounted in a mounting groove defined in a joint area between a roof panel and a side structure, wherein said mounting groove comprises a first rising wall extending vertically downwards from a side edge of one of a roof panel body and the side structure, a second rising wall extending downwards from a side edge of the other of the roof panel body and the side structure obliquely relative to the first rising wall, wherein a lower end of the second rising wall is spaced apart further from said first rising wall than an upper end of the second rising wall is spaced apart from an upper end of the first rising wall, and a bottom wall which connects the lower ends of said first and second rising walls to each other, wherein said roof molding is a single piece component comprising a lid that covers the mounting groove, a base portion that extends downward from a lower surface of said lid and has a notch defined in a side opposed to said first rising wall, and a pair of lips extending laterally from a lower end of said base portion and resiliently abutting against said first and second rising walls, wherein the other of said roof panel body and said side structure comprises a step which said lid of the roof molding abuts against.

2. A structure to mount a roof molding to a vehicle, wherein the roof molding is mounted in a mounting groove defined in a joint area between a roof panel and a side structure, wherein the mounting groove comprises a first rising wall extending vertically downwards from a side edge of a roof panel body, a second rising wall extending downwards from a side edge of the side structure, the second rising wall extending obliquely relative to the first rising wall, wherein a lower end of the second rising wall is spaced apart further from the first rising wall than an upper end of the second rising wall is spaced apart from an upper end of the first rising wall, and a bottom wall connecting the lower ends of the first and second rising walls to each other, wherein the roof molding includes a lid covering the mounting groove, a base portion that extends downwards from a lower surface of the lid, and a pair of lips extending laterally from a lower end of the base portion, the pair of lips resiliently abutting against the first and second rising walls, respectively, wherein the side structure comprises a step, an end of the lid on the side of the side structure is placed in direct abutment against the step in a widthwise direction of the mounting groove at a position above the mounting groove, so as to prevent the roof molding from falling out of the mounting groove due to a large resistance against movement received from the first rising wall when a pulling-up force is applied to an end of the lid on the side of the roof panel body, and wherein a notch is defined in a side of the base portion opposed to the first rising wall.

3. A structure to mount a roof molding to a vehicle, wherein the roof molding is mounted in a mounting groove defined in a joint area between a roof panel which is formed by pressing and a side structure, wherein the mounting groove comprises a first rising wall extending vertically downwards from a side edge of a roof panel body, a second rising wall extending downwards from a side edge of the side structure, the second rising wall extending obliquely relative to the first rising wall, wherein a lower end of the second rising wall is spaced apart further from the first rising wall than an upper end of the second rising wall is spaced apart from an upper end of the first rising wall, and a bottom wall connecting the lower ends of the first and second rising walls to each other, wherein the roof molding includes a lid covering the mounting groove, a base portion that extends downwards from a lower surface of the lid, and a pair of lips extending laterally from a lower end of the base portion, the pair of lips resiliently abutting against the first and second rising walls, respectively, wherein the side structure comprises a step, an end of the lid on the side of the side structure is placed in direct abutment against the step in a widthwise direction of the mounting groove at a position above the mounting groove, so as to prevent the roof molding from falling out of the mounting groove due to a large resistance against movement received from the first rising wall when a pulling-up force is applied to an end of the lid on the side of the roof panel body and the lid is about to be caused to rotate around the one end of the lid placed in abutment against the side structure serving as a pivot, and wherein a notch is defined in a side of the base portion opposed to the first rising wall.

* * * * *

UNITED STATES PATENT AND TRADEMARK OFFICE
CERTIFICATE OF CORRECTION

PATENT NO. : 6,877,798 B2
DATED : April 12, 2005
INVENTOR(S) : Nakajima et al.

It is certified that error appears in the above-identified patent and that said Letters Patent is hereby corrected as shown below:

Title page,
Insert Item -- [30]    Foreign Application Priority Data
     Jul. 19, 2000    (JP)    2000-219054 --.

Signed and Sealed this

Twenty-seventh Day of September, 2005

JON W. DUDAS
*Director of the United States Patent and Trademark Office*